INVENTOR.
Thomas B. Dilworth &
BY   James W. Tharp
J. L. Carpenter
ATTORNEY

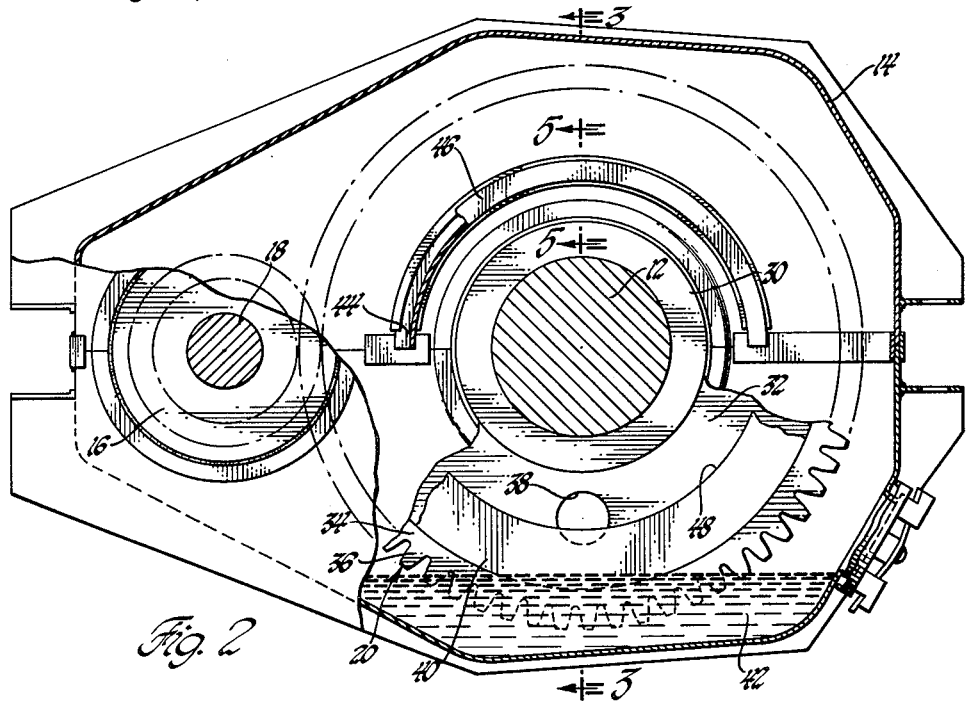
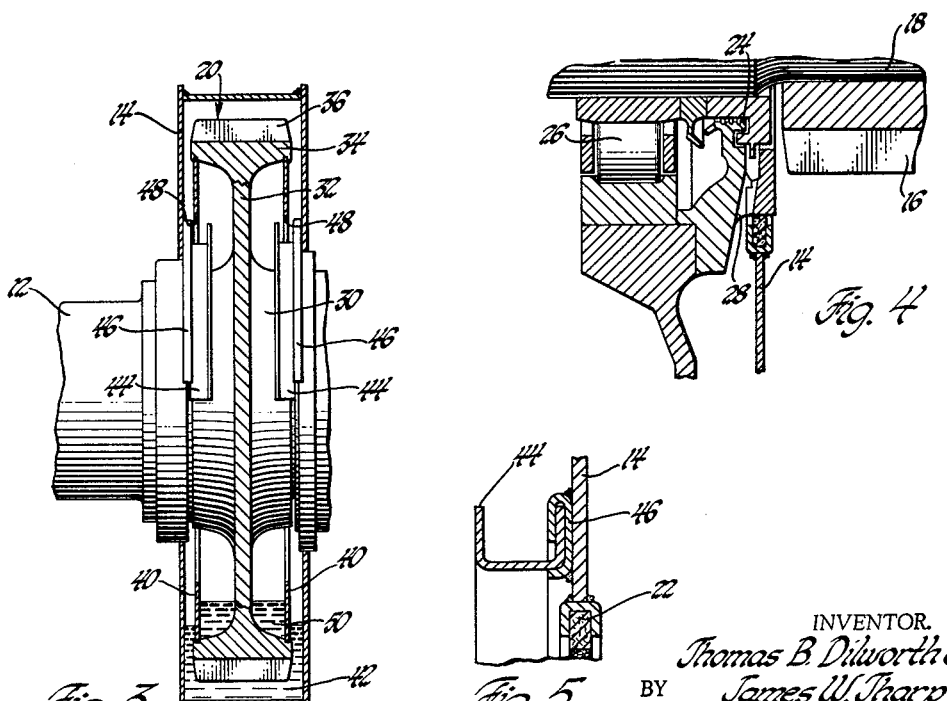

United States Patent Office 3,167,969
Patented Feb. 2, 1965

3,167,969
TRACTION MOTOR GEAR CASE
Thomas B. Dilworth and James W. Tharp, Hinsdale, Ill., assignors to General Motors Corporation, Detroit, Mich., a corporation of Delaware
Filed Aug. 31, 1962, Ser. No. 220,713
6 Claims. (Cl. 74—467)

This invention relates to a lubricant filled gear case and more particularly to such a gear case for housing the pinion and gear which form the drive train between the traction motor and axle of an electrically propelled locomotive. The invention is specifically concerned with means associated with at least one of the gears housed in such gear cases to increase the lubricant storage capacity of such case.

An object of this invention is to provide means to retain lubricant in one or more areas of one of the gears in a gear case during running of the the gears therein. A further object of this invention is to provide means to direct lubricant into such areas for storage during running of the gears. Another object of this invention is to provide means to equalize the storage of lubricant deposited in these areas.

These and other objects, advantages and features of the invention will become fully apparent as reference is had to the accompanying specification and drawings wherein:

FIGURE 2 is a view taken substantially along the lines 2–2 of FIGURE 1, with sections cut away, showing the traction motor drive pinion and the improved locomotive axle gear.

FIGURE 3 is a view taken substantially along lines 3–3 of FIGURE 2 showing the axle gear partly in section with the improved discs mounted thereon and the drip channels in the gear box to direct the lubricant into the storage areas.

FIGURE 4 is a view taken substantially along the lines 4–4 of FIGURE 1 showing the labyrinth seal between the traction gear case and the traction motor armature shaft bearings.

FIGURE 5 is a view taken substantially along lines 5–5 of FIGURE 2 showing a cross section of one of the drip channels and the bracket mounting it on the gear case.

Figure 1:
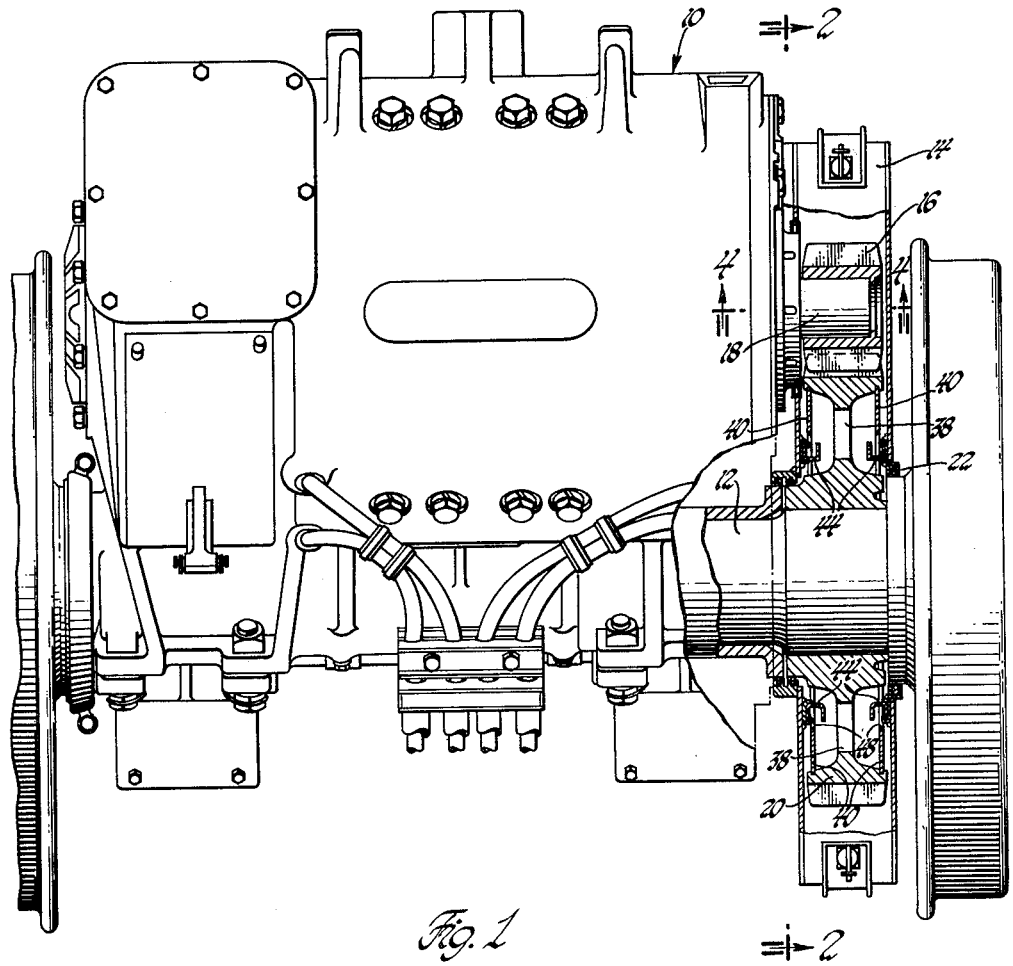
FIGURE 1 is a plan view with sections cut away of a locomotive traction motor and gear box including the means associated with the gearing to increase the storage of lubricant in the gear box.

Referring to FIGURE 1, a traction motor 10 is mounted in a conventional manner on an axle 12 of a locomotive truck. On one side of the traction motor housing is a traction gear case 14 which includes a drive pinion 16 secured to the armature shaft 18 of the traction motor 10. In meshing engagement with the drive pinion 16 is a driven gear wheel 20 which is secured to axle 12. A belt rubbing seal type gasket 22 is used between the traction gear case 14 and the axle 12 to prevent the escape of lubricant in this area.

Referring to FIGURE 4, a labyrinth type seal 24 is utilized to join the gear case 14 with the traction motor case and prevent the lubricant from the traction gear case being mixed with the lubricant for the armature shaft bearings 26. In the labyrinth seal 24 there is an opening 28 to permit lubricant in the gear box 14 to drop to the roadbed to prevent it from reaching the armature shaft bearings 26 and contaminating the special lubricant provided for these bearings.

Referring now to FIGURES 2 and 3, the driven gear wheel or axle gear 20 consists of a hub portion 30, a web portion 32 and an exterior rim 34 having teeth 36 around the outer periphery. Openings 38 are provided in the web portion 32 at intervals about the wheel, for purposes which will be described later. Attached to the rim 34 are parallel washer-shaped discs 40 which extend radially from each side of the rim 34 toward the hub 30. The discs 40 along with the web portion 32 and the rim portion 34 form generally annular areas or reservoirs on each side of the web. The lubricant 42 forms a bath in the bottom of the gear case 14, so that as the gear 20 rotates the lubricant 42 will adhere to the teeth 36 and lubricate the meshing engagement of drive pinion 16 and axle gear 20.

Referring to FIGURES 2, 3 and 5 there is shown drip channels 44 which slide into brackets 46. Brackets 46 are welded or otherwise suitably secured to the upper section of traction gear case 14. It will be observed that the channels 44 are of sufficient size and so located that they partially extend through the circular openings 48 in discs 40 into the lubricant storage areas formed by discs 40, web 32 and rim 34.

In operation, as the axle gear 20 rotates, a portion of the wheel passes through the lubricant bath in the bottom of the gear case. In passing through the lubricant bath, the teeth 36 and rim portion 34 are coated with lubricant. Continued rotation of axle gear 20 moves the teeth and rim portion which have been coated with the lubricant to an upper position so that excess lubricant will be centrifuged or will drop from the teeth and rim portions and drain toward the lubricant bath. As the lubricant drains from the rim and teeth it is caught in the drip channels 44. The lubricant flows downwardly along the drip channels 44 and is directed into the reservoirs formed by the water-shaped discs 40, rim portion 34 and web section 32. Reservoir pools 50 of lubricant thus are formed, as seen in FIGURE 3.

During the rotation of axle 12, the centrifugal force will hold the oil in the reservoir pools 50 and the openings or holes 38 will permit the oil to flow from one reservoir to the other equalizing the amount of oil in each reservoir. After only a short time of operation, the lubricant thrown from the gear teeth and rim portion eventually will be stored in the reservoirs so that only a lesser amount of lubricant for lubrication of the meshing gears will remain in the lubricant bath at the bottom of the gear case. It is readily apparent that the lubricant positioned in the reservoirs will reduce lubricant and pressures in the gear case which otherwise result in lubricant splashing and leakage during operation. When the axle gear stops rotating, lubricant drains from the gear reservoirs back into the gear case. Only a small quantity of lubricant at the bottom of the gear is restricted by the side plates so that it cannot drain back into the lubricant bath. This method of storing lubricant during operation allows a larger initial supply of lubricant to be carried in the gear case and extends the time before it is necessary to replenish the lubricant supply.

While but one embodiment of the invention has been shown and described it will be evident that numerous changes and modifications may be made therein. It is therefore to be understood that it is not intended to limit the invention to the embodiments shown but only by the scope of the claims which follow.

We claim:
1. In combination with a gear case, a gear mounted for rotation therein, said gear case adapted to contain lubricant therein, means to increase the lubricant storage capacity of said gear case comprising a hub and a rim connected by a web forming a part of said gear, and a disc secured to the inner periphery of said rim and forming therewith a storage area for the reception of lubricant, said storage area being adapted to retain lubricant above the level of lubricant contained in said gear case.
2. In combination with a gear case, a gear mounted for rotation therein, said gear case adapted to contain lubricant therein, means to increase the lubricant storage capacity of said gear case comprising a hub and a rim connected by a web forming a part of said gear, a disc secured to the inner periphery of said rim and forming therewith a storage area for the reception of lubricant and means for collecting and directing the lubricant into said storage area, said storage area being adapted to retain lubricant above the level of lubricant contained in said gear case.

3. In combination with a gear case, a gear mounted for rotation therein, said gear case adapted to contain lubricant therein, means to increase the lubricant storage capacity of said gear case comprising a hub and a rim connected by a web forming a part of said gear, a disc secured to the inner periphery of said rim and forming therewith a storage area for the reception of lubricant, a channel adapted to collect lubricant and said channel being adapted to channel the lubricant into said storage area.

4. Apparatus as claimed in claim 3 having a bracket secured to said gear case adapted to slidably receive and retain said channel in assembled position.

5. In combination with a gear case, a gear mounted for rotation therein, said gear case adapted to contain lubricant therein, means to increase the lubricant storage capacity of said gear case comprising a hub and a rim connected by a web forming a part of said gear and a pair of discs secured to the inner periphery of said rim, said discs being parallel and extending radially from said rim toward said hub and forming with said rim a storage area for the reception of lubricant on each side of said web, and a channel adapted to collect and channel lubricant into said storage area.

6. Apparatus as claimed in claim 5 with said web having apertures therein at spaced intervals adjacent said rim to equalize the amount of lubricant in said storage areas.

References Cited in the file of this patent
UNITED STATES PATENTS

| | | |
|---|---|---|
| 1,813,820 | Ross | July 7, 1931 |
| 1,960,693 | Bryant | May 29, 1934 |
| 3,065,822 | McAffee et al. | Nov. 27, 1962 |